US011789450B2

(12) United States Patent  
Ishii et al.

(10) Patent No.: US 11,789,450 B2  
(45) Date of Patent: Oct. 17, 2023

(54) VEHICLE CONTROL SYSTEM

(71) Applicant: Hitachi Construction Machinery Co., Ltd., Tokyo (JP)

(72) Inventors: Hirotake Ishii, Tokyo (JP); Tomoyuki Hamada, Tokyo (JP); Hidefumi Ishimoto, Tokyo (JP); Akiyoshi Kirimura, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 99 days.

(21) Appl. No.: 17/594,961

(22) PCT Filed: May 8, 2020

(86) PCT No.: PCT/JP2020/018601  
§ 371 (c)(1),  
(2) Date: Nov. 4, 2021

(87) PCT Pub. No.: WO2020/226168  
PCT Pub. Date: Nov. 12, 2020

(65) Prior Publication Data  
US 2022/0308589 A1   Sep. 29, 2022

(30) Foreign Application Priority Data

May 8, 2019   (JP) ................................ 2019-088278

(51) Int. Cl.  
*G05D 1/02* (2020.01)  
*H04W 4/40* (2018.01)  
(Continued)

(52) U.S. Cl.  
CPC ............ *G05D 1/0214* (2013.01); *G01S 19/14* (2013.01); *G05D 1/0276* (2013.01); *G08G 1/16* (2013.01);  
(Continued)

(58) Field of Classification Search  
CPC ............... G05D 1/0214; G05D 1/0276; G05D 2201/021; G05D 1/0289; G01S 19/14;  
(Continued)

(56) References Cited

U.S. PATENT DOCUMENTS

| 6,226,572 B1 | 5/2001 | Tojima et al. |
| 2016/0042642 A1 | 2/2016 | Yamashiro et al. |
| 2017/0169709 A1 | 6/2017 | Ando |

FOREIGN PATENT DOCUMENTS

| CN | 203233545 U | 10/2013 |
| JP | 10-222227 A | 8/1998 |

(Continued)

OTHER PUBLICATIONS

International Search Report (PCT/ISA/210) issued in PCT Application No. PCT/JP2020/018601 dated Jul. 21, 2020 with English translation (five (5) pages).

(Continued)

*Primary Examiner* — Rodney A Butler  
(74) *Attorney, Agent, or Firm* — Crowell & Moring LLP

(57) ABSTRACT

A vehicle control system includes an autonomous traveling vehicle configured to autonomously travel in a mine, a manned vehicle. The autonomous traveling vehicle and the manned vehicle each include an own position estimating device and a vehicle mounted communication terminal. The autonomous traveling vehicle and the manned vehicle are communicatively connected via one wireless channel. The manned vehicle transmits manned vehicle location information using a first communication method at a first granularity. When a distance from the manned vehicle is determined to be a first inter-vehicular distance threshold or less based on the manned vehicle location information transmitted by the first communication method, the autonomous traveling vehicle instructs the manned vehicle to transmit the manned vehicle location information by a second communication (Continued)

method different from the first communication method at a second granularity smaller than the first granularity.

9 Claims, 13 Drawing Sheets

(51) Int. Cl.
*G01S 19/14* (2010.01)
*G08G 1/16* (2006.01)

(52) U.S. Cl.
CPC ........ *H04W 4/40* (2018.02); *G05D 2201/021* (2013.01)

(58) Field of Classification Search
CPC .......... G08G 1/16; G08G 1/166; G08G 1/163; H04W 4/40; H04W 4/023; H04W 4/90; H04W 4/029
See application file for complete search history.

(56) References Cited

FOREIGN PATENT DOCUMENTS

| | | | |
|---|---|---|---|
| JP | 2000-315112 | A | 11/2000 |
| JP | 2014-203398 | A | 10/2014 |
| JP | 2017-72946 | A | 4/2017 |
| JP | 2017-111576 | A | 6/2017 |
| JP | 2018-18379 | A | 2/2018 |

OTHER PUBLICATIONS

Japanese-language Written Opinion (PCT/ISA/237) issued in PCT Application No. PCT/JP2020/018601 dated Jul. 21, 2020 (four (4) pages).

Japanese-language International Preliminary Report on Patentability (PCT/IPEA/409) issued in PCT Application No. PCT/JP2020/018601 dated Apr. 15, 2021, including Annexes (nine (9) pages).

Fig. 4

| Communication Distance | Modulation Scheme | Code Rate | Communication Speed Ratio |
|---|---|---|---|
| 100m | 64QAM | 5/6 | 10.0 |
| 200m | 64QAM | 1/2 | 6.0 |
| 400m | 16QAM | 5/6 | 4.8 |
| 600m | 16QAM | 1/2 | 3.0 |
| 800m | QPSK | 5/6 | 2.4 |
| 1km | QPSK | 1/2 | 1.5 |
| 1km< | QPSK | 1/3 | 1.0 |

Fig. 11

| Track | Unloading Site | Ascending slope | Tracking | Loading Cargo | Priority |
|---|---|---|---|---|---|
| O(3) | | | | O(5) | 8 |
| | O(5) | | | O(1) | 6 |
| O(3) | | | | | 3 |
| O(3) | | | O(4) | O(3) | 10 |
| O(3) | | O(4) | | O(4) | 11 |
| | O(5) | | | O(2) | 7 |
| O(3) | | | | | 4 |

VEHICLE CONTROL SYSTEM

TECHNICAL FIELD

The present invention relates to a vehicle control system and especially relates to a vehicle control system that allows controlling an autonomous traveling vehicle in a mine site.

BACKGROUND ART

Because of a steep rise of labor costs and improvement in safety, a demand for autonomous traveling of a transport vehicle in a mine site is high. In response to the demand, there has been known a technique that causes a transport vehicle that conveys earth and sand and mineral substances in a mine site to autonomously travel in accordance with instructions from a control server or the like, not by manned operation. For example, Patent Literature 1 discloses a technique that transmits location data between vehicles, monitors the mutual positional relationship, and decelerates or stops the vehicle when the vehicles excessively approach one another to avoid interference. Patent Literature 2 discloses a technique that transmits an emergency stop signal to all transport vehicles that travel in a mine site only when an emergency stop input device is operated on a transport vehicle that travels in the mine site.

However, frequent decelerations or stops of the transport vehicles reduce conveyance efficiency, leading to a decrease in productivity of a mining work in the mine. In view of this, there has been a demand that the transport vehicle is desired to be decelerated or stopped only when required. In some cases, a worker and a manned vehicle perform an on-the-spot work in an autonomous traveling area, so it is also demanded that the worker and the manned vehicle stop the transport vehicle during the autonomous traveling by remote operation in case of emergency to ensure safety.

Considering safety, a function that transmits and receives location data between vehicles, monitors the mutual positional relationship, and decelerates or stops the vehicle when the vehicles excessively approach one another to avoid interference is also required. In the case, from an aspect of maintaining the productivity of the mining work in the mine while maintaining safety, there is a demand that a deceleration time of the transport vehicle is shortened as much as possible to eliminate an unnecessary stop. However, with the techniques disclosed in Patent Literature 1 and Patent Literature 2, achieving both of ensuring safety and improvement in productivity is difficult.

CITATION LIST

Patent Literature

Patent Literature 1: JP H10-222227 A
Patent Literature 2: JP 2017-72946 A

SUMMARY OF INVENTION

Technical Problem

The present invention has been made in view of the above-described problems, and an object of the present invention is to provide a vehicle control system that allows achieving both of ensuring safety and improvement in productivity.

Solution to Problem

A vehicle control system according to the present invention including: an autonomous traveling vehicle configured to autonomously travel in a mine and a manned vehicle in which: the autonomous traveling vehicle and the manned vehicle each include an own position estimating device and a vehicle mounted communication terminal, and the autonomous traveling vehicle and the manned vehicle are communicatively connected via one wireless channel. In the system, the manned vehicle transmits manned vehicle location information using a first communication method at a first granularity. When a distance from the manned vehicle is determined to be a first inter-vehicular distance threshold or less based on the manned vehicle location information transmitted by the first communication method, the autonomous traveling vehicle instructs the manned vehicle to transmit the manned vehicle location information by a second communication method different from the first communication method at a second granularity smaller than the first granularity. When the manned vehicle receives the instruction to transmit the manned vehicle location information using the second communication method at the second granularity from the autonomous traveling vehicle, the manned vehicle transmits the manned vehicle location information using the second communication method at the second granularity.

Advantageous Effects of Invention

With the vehicle control system of the present invention, the vehicle control system that allows reducing unnecessary deceleration or stop of the autonomous traveling vehicle while maintaining safety when the autonomous traveling vehicle approaches the manned vehicle and allows achieving both of improvement in safety and improvement in productivity can be provided.

BRIEF DESCRIPTION OF DRAWINGS

FIG. 4 is a table showing an example of selectable modulation scheme and code rate thereof and a communication speed ratio for each communication distance.

FIG. 11 is a table describing an example of determining the priorities according to sums of a plurality of elements.

DESCRIPTION OF EMBODIMENTS

Figure 1:
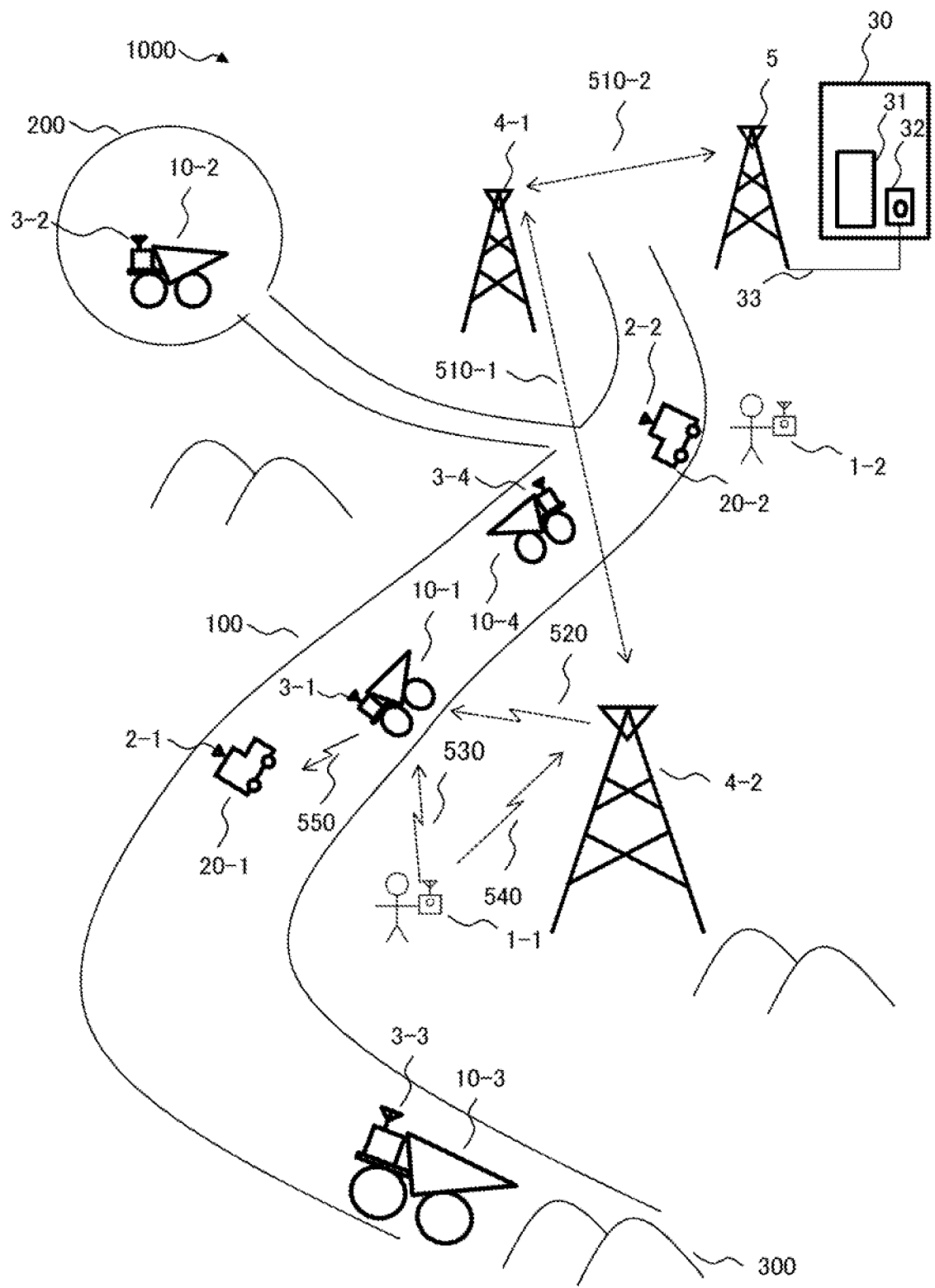
FIG. 1 is a schematic diagram illustrating an example of an overall configuration of a vehicle control system 1000 according to a first embodiment.

The following will describe embodiments in detail based on the drawings. Note that, in all drawings describing the embodiments, the same or related reference numerals are given to members having the same functions, and repeated description thereof will be omitted. In the following embodiments, unless otherwise especially required, descriptions of the same or similar parts will not be repeated in principle.

In the following embodiments, when necessary for the sake of convenience, the description will be given by being divided into a plurality of sections or embodiments. In the following embodiments, in a case where the number of elements and the like (including a quantity, a value, an amount, a range, and the like) are mentioned, except for, for example, a case of being especially clarified or a case of being clearly limited to the specific number in principle, the numbers are not limited to the specific numbers, and may be specific numbers or more or less. Note that, in the following embodiments, the components (including process steps and the like) are not always essential except for, for example, a case of being especially clarified or a case of being considered to be clearly essential in principle.

First Embodiment

The following will describe a vehicle control system according to the first embodiment of the present invention in detail with reference to the drawings. FIG. 1 is a schematic diagram illustrating an example of an overall configuration of a vehicle control system 1000 according to the first embodiment.

In FIG. 1, the vehicle control system 1000 includes portable transmission terminals 1-1 and 1-2, manned vehicle mounted communication terminals 2-1 and 2-2, unmanned vehicle mounted communication terminals 3-1 to 3-4, relay base stations 4-1 and 4-2, a control base station 5, autonomous traveling vehicles (hereinafter referred to as "unmanned dump trucks") 10-1 to 10-4, manned vehicles 20-1 and 20-2 by manned operation, and a control center 30. The unmanned dump trucks 10-1 to 10-4 are transport vehicles that aim to convey loads, such as earth and sand and ores, can perform unmanned autonomous traveling, and convey earth and sand and mined materials. In the control center 30, an operation management system 31 and an emergency deceleration/stop input device 32 are installed.

Note that the numbers of respective devices are not limited to the illustrated ones and specific numbers. For example, the unmanned vehicle mounted communication terminals 3-1 to 3-4 and the unmanned dump trucks 10-1 to 10-4 may be one configuration or plural configurations, and the manned vehicle mounted communication terminal and the manned vehicle also may be one configuration or plural configurations. Although not illustrated, a system required for autonomous traveling for the unmanned dump trucks 10-1 to 10-4 to autonomously travel is disposed in a work site in a mine.

The configurations of the portable transmission terminals 1-1 and 1-2 may be all the same or may be different. Hereinafter, the portable transmission terminals 1-1 and 1-2 are collectively described as a "portable transmission terminal 1" without distinction in some cases. Similarly, the manned vehicle mounted communication terminals 2-1 and 2-2, the unmanned vehicle mounted communication terminals 3-1 to 3-4, the relay base stations 4-1 and 4-2 are collectively described as the "manned vehicle mounted communication terminal 2," "the unmanned vehicle mounted communication terminal 3," and "the relay base station 4" in some cases. Since the unmanned dump trucks 10-1 to 10-4 may all have the same configurations, they are collectively described as the "unmanned dump truck 10" in some cases. The manned vehicles 20-1 and 20-2 are also collectively referred to as the "manned vehicle 20" in some cases.

The unmanned dump truck 10 is an autonomous traveling vehicle that is operated without a riding of a driver in principle and can perform unmanned traveling based on control by the vehicle control system 1000. Note that while the control target of the system is the unmanned dump truck, the autonomous traveling vehicle as the control target for the system is not limited to the unmanned dump truck. The manned dump truck can also be the control target and the control similar to that for the unmanned dump truck 10 can be performed on the manned dump truck. The unmanned dump truck 10 performs unmanned autonomous traveling on a preliminarily configured track 100 in the mine site. For example, the unmanned dump truck 10 reciprocates between a shovel (not illustrated) with which a loading work of earth and sand and ores is performed in a loading site 200 and an unloading site 300 on the track 100 to convey the loads.

Note that, in the mine site, in addition to the unmanned dump truck 10, which conveys the loads, such as earth and sand and ores, the manned vehicle 20 travels. The manned vehicle 20 is a vehicle configured such that the driver and other occupants can get on and the driver can perform the driving operation. For example, the manned vehicle 20 can include a shovel with which excavation and a loading work are performed at the loading site 200, a bulldozer that bulldozes a road surface of the track 100, a sprinkler truck, and a service car that patrols in the mine site.

The portable transmission terminal 1 is a portable device portable by a worker in the mine site and is an emergency stop device that instructs an emergency stop of the unmanned dump truck 10 in case of emergency. The manned vehicle mounted communication terminal 2 is an onboard device mounted on the manned vehicle 20 and is an emergency stop device that instructs an emergency stop of the unmanned dump truck 10 in case of emergency by the driver or the occupant of the manned vehicle 20. Here, "in case of emergency" means a general situation in which the unmanned dump truck 10 need to be stopped, and, for example, is a situation in which the unmanned dump trucks 10 or the unmanned dump truck 10 and the manned vehicle 20 possibly contact and interfere with one another or a situation in which the worker and the unmanned dump truck 10 possibly contact and interfere with one another.

The unmanned vehicle mounted communication terminals 3-1 to 3-4 are wireless receiving devices mounted on the unmanned dump trucks 10-1 to 10-4, respectively. The unmanned vehicle mounted communication terminals 3-1 to 3-4 receive an emergency deceleration/stop signal to stop the unmanned dump trucks 10-1 to 10-4 transmitted from the portable transmission terminal 1 or the manned vehicle mounted communication terminal 2. The emergency deceleration/stop signal can be directly received from the terminals, and the emergency deceleration/stop signal can be received by relay via the relay base station 4 or the control base station 5. When the unmanned vehicle mounted communication terminals 3-1 to 3-4 receive the emergency deceleration/stop signal, the unmanned dump trucks 10-1 to 10-4 decelerate or stop traveling. An installation position of an antenna for the unmanned vehicle mounted communication terminal 3 mounted on the unmanned dump truck 10 is not limited to a specific position. As one example, the antenna can be installed at a position that allows a good line-of-sight condition, for example, at a front of the upper surface of the unmanned dump truck 10.

The portable transmission terminal 1 and the manned vehicle mounted communication terminal 2 can transmit the emergency deceleration/stop signal from, for example, the track 100, the loading site 200, and the unloading site 300 in the site. The unmanned vehicle mounted communication terminal 3 can directly or indirectly receive the emergency deceleration/stop signal transmitted from the portable transmission terminal 1 or the manned vehicle mounted communication terminal 2. Each of the relay base stations 4 and the control base station 5 is installed at a position wirelessly communicatable with the unmanned dump truck 10 and the manned vehicle 20 in the places where the unmanned dump truck 10 and the manned vehicle 20 possibly move, such as the track 100, the loading site 200, and the unloading site 300 are possible.

For mutual communications, the respective relay base stations 4 and the control base station 5 are wirelessly connected, can relay the emergency deceleration/stop signal transmitted from the portable transmission terminal 1 and the manned vehicle mounted communication terminal 2, and instruct all of the unmanned dump trucks 10 in the mine site to perform emergency deceleration or stop. Thus, issuance of the emergency deceleration/stop signal from any of the portable transmission terminal 1 and the manned vehicle mounted communication terminal 2 allows all of the unmanned dump trucks other than the unmanned dump truck 10 that need to decelerate or stop to be decelerated or stopped as well.

The emergency deceleration/stop input device 32 installed in the control center 30 and the control base station 5 are connected to one another with a wired line 33. The emergency deceleration/stop input device 32 is a device that instructs the emergency deceleration or stop according to an operation by an operator. Using the emergency deceleration/stop input device 32, an operator in the control center 30 can instruct all of the unmanned dump trucks 10 to perform the emergency deceleration/stop via the control base station 5. It has been described that the emergency deceleration/stop input device 32 is connected to the control base station 5, but may be connected to the relay base station 4.

The manned vehicle mounted communication terminal 2 mounted on the manned vehicle 20 and the unmanned vehicle mounted communication terminals 3-1 to 3-4 mounted on the unmanned dump trucks 10 have a GPS reception function. The GPS reception function allows the unmanned dump trucks 10 and the manned vehicle 20 to identify own location information. The manned vehicle mounted communication terminal 2 mounted on the manned vehicle 20 has a function of transmitting own location information. Using the location information of the manned vehicle 20 transmitted from the manned vehicle 20 and the own location information obtained by the GPS reception function equipped with the unmanned dump truck 10, the unmanned vehicle mounted communication terminal 3 mounted on the unmanned dump truck 10 can obtain a vehicle-to-vehicle distance (a communication distance of vehicle-to-vehicle communication) between the unmanned dump truck 10 and the manned vehicle 20.

Note that, in the description of this embodiment, the wireless line configured inside the vehicle control system 1000 is defined as follows.

- A wireless line for mutual communications between each of the relay base stations 4 and the control base station 5 is referred to as a "road-to-road communication 510."
- A wireless line for mutual communications between each relay base station 4 and the unmanned dump truck 10 or the manned vehicle 20 is referred to as a "road-to-vehicle communication 520."
- A wireless line for mutual communications between the portable transmission terminal 1 and the unmanned dump truck 10 is referred to as a "pedestrian-to-vehicle communication 530."
- A wireless line for mutual communications between the portable transmission terminal 1 and each of the relay base stations 4 is referred to as a "pedestrian-to-road communication 540."
- A wireless line for mutual communications between the unmanned dump truck 10 and the manned vehicle 20 is referred to as a "vehicle-to-vehicle communication 550."

Figure 2:
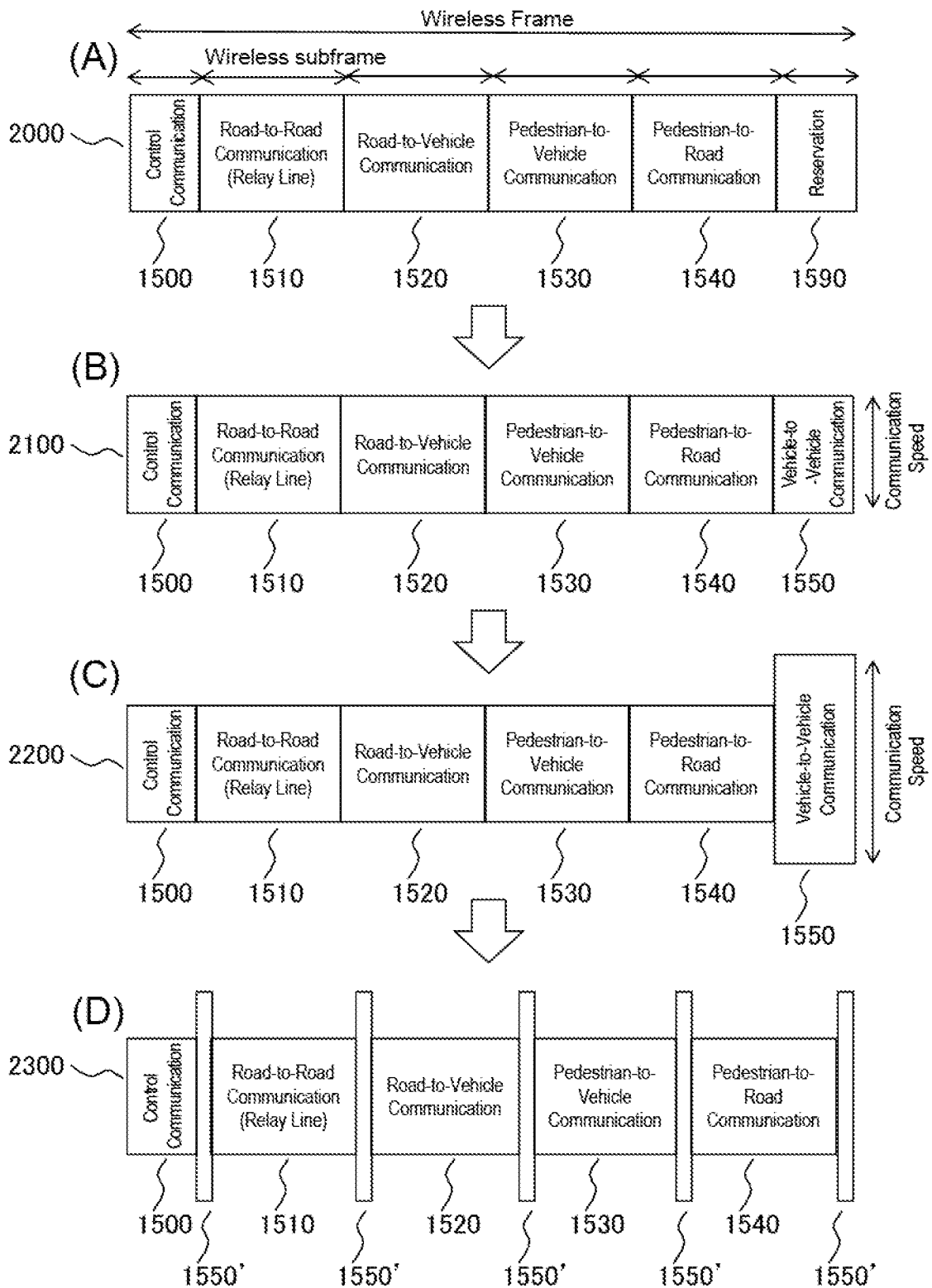
FIGS. 2A-2D include schematic diagrams illustrating an example of wireless frames and subframes used in the vehicle control system 1000.

FIG. 2 includes drawings illustrating an example of wireless frames transmitted at predetermined intervals and subframes constituting the wireless frames used in the vehicle control system 1000. The wireless frames are transmitted on one wireless channel at predetermined intervals. For communication connection between a plurality of wireless base stations and a wireless terminal via a plurality of communication channels on one wireless channel, a multiplexing scheme is used to reduce an interference of mutual communications. There has been known a Carrier Sense Multiple Access/Collision Avoidance (CSMA-CA) scheme that uses a carrier sense used in, for example, a Wi-Fi system and a time division multiplexing scheme referred to as Time Division Multiple Access (TDMA) that preliminarily separates a wireless frame in a unit referred to as a subframe according to a plurality of wireless base stations and a wireless terminal or a plurality of communication channels and in which a connection opportunity is steadily given to all subframes as the multiplexing scheme to reduce the interference.

Generally, in the CSMA-CA scheme, increases in the numbers of wireless base stations and wireless terminals causes a problem that a connection opportunity is less likely to be obtained. In view of this, the wireless system emphasizing safety employs the time division multiplexing scheme in which the connection opportunity is steadily given in many cases.

In a subframe allocation 2000 illustrated in FIG. 2(A), the wireless frame is separated at predetermined intervals (for example, one second interval) in accordance with the time division multiplexing scheme. As one example, the wireless frame can be divided into a control communication subframe 1500 for assigning control communication according to the plurality of communication channels, a road-to-road communication subframe 1510 for assigning the road-to-road communication 510, a road-to-vehicle communication subframe 1520 for assigning the road-to-vehicle communication 520, a pedestrian-to-vehicle communication subframe 1530 for assigning the pedestrian-to-vehicle communication 530, a pedestrian-to-road communication subframe 1540 for assigning the pedestrian-to-road communication 540, and a reservation subframe 1590 for assignment to an application other than them.

The control communication includes communications for distribution of a notification parameter required for the relay base station 4, the portable transmission terminal 1, the manned vehicle mounted communication terminal 2, and the unmanned vehicle mounted communication terminal 3 to start communications, and for performing a connecting procedure required to start the communications. Although not illustrated in FIG. 2, between the respective subframes, an interval referred to as a guard time to avoid an interference due to a difference in a propagation delay time is actually provided. With the use of a Time Division Duplex (TDD) scheme that performs communications at the same frequency in an upstream channel and a downstream channel, each subframe is possibly divided into two in the downstream channel and in the upstream channel. Instead of the TDD scheme, a Frequency Division Duplex (FDD) scheme that performs communications at different frequencies in the downstream channel and the upstream channel is also usable.

Each of the portable transmission terminals 1, each of the manned vehicle mounted communication terminals 2, the unmanned vehicle mounted communication terminal 3, each of the relay base stations 4, and the control base station 5 are assigned with predetermined subframes, depending on the communication counterparty. Communications required to maintain safety of the emergency deceleration/stop signal or the like are all assigned to the control communication subframe 1500, the road-to-road communication subframe 1510, the road-to-vehicle communication subframe 1520, the pedestrian-to-vehicle communication subframe 1530, and the pedestrian-to-road communication subframe 1540. Since each subframe is given in each one wireless frame, a communication opportunity is always given to each of the portable transmission terminals 1, each of the manned vehicle mounted communication terminals 2, the unmanned vehicle mounted communication terminal 3, each of the relay base stations 4, and the control base station 5 in each wireless frame.

The above-described reservation subframe can be appropriately assigned to other applications. For example, a subframe allocation 2100 illustrated in FIG. 2(B) shows a case where a vehicle-to-vehicle communication subframe 1550 for assignment to the vehicle-to-vehicle communication is assigned to the part of the reservation subframe 1590 in FIG. 2(A). The reservation subframe 1590 in the subframe allocation 2000 in FIG. 2(A) is assigned as the remaining part after the control communication subframe 1500, the road-to-road communication subframe 1510, the road-to-vehicle communication subframe 1520, the pedestrian-to-vehicle communication subframe 1530, and the pedestrian-to-road communication subframe 1540 are assigned to one wireless frame. In view of this, the subframe length of the reservation subframe 1590 is inevitably shorter than those of the other subframes, and a wireless resource assigned to the vehicle-to-vehicle communication subframe 1550 is small without change, thus causing a problem that the vehicle-to-vehicle communication 550 that should be originally assigned cannot be assigned.

Here, considering an environment of a mine including a distance between the relay base station 4 and the control base station 5, a distance between the relay base station 4 or the control base station 5 and the unmanned vehicle 10, and the like, the communication distances in the road-to-road communication 510 and the road-to-vehicle communication 520 need to be secured by around several km to 10 km. On the other hand, when communications are performed only when the unmanned dump truck 10 approaches the manned vehicle 20, the communication distance in the vehicle-to-vehicle communication 550 is sufficient at around several 100 m.

In the wireless communication, distributing the resources similarly between the communication method that requires the communication distance of around several km to 10 km and the communication method in which the communication distance is sufficient at several 100 m is inefficient. Therefore, in the system of the first embodiment, for example, a QPSK modulation scheme (a code rate: ⅓) is assigned to the long-distance communication with the communication distance of around several km to 10 km as a first communication method. On the other hand, for example, a 64 QAM modulation scheme (a code rate: ⅚) is assigned to a short range communication with a communication distance of around several 100 m as a second communication method. In this case, a communication speed in the short range communications using the second communication method becomes 10 times of a communication speed in the long-distance communication. In a subframe allocation 2200 illustrated in FIG. 2(C), the first communication method is applied to a control communication 500, the road-to-road communication 510, the road-to-vehicle communication 520, the pedestrian-to-vehicle communication 530, and the pedestrian-to-road communication 540, and the second communication method is applied to the vehicle-to-vehicle communication 550. A large communication speed (a vertical axis) is obtained in the vehicle-to-vehicle communication subframe 1550 to which the vehicle-to-vehicle communication 550 is assigned.

FIG. 2(D) illustrates an example of a subframe allocation 2300 in which a vehicle-to-vehicle communication subframe 1550' to which the vehicle-to-vehicle communication 550 is assigned is plurally divided and disposed in one wireless frame. Similarly to the case of FIG. 2(C), a large communication speed (a vertical axis) is obtained in the vehicle-to-vehicle communication subframe 1550' to which the vehicle-to-vehicle communication 550 is assigned. In the subframe allocation 2300, a plurality of times of (in the case of FIG. 2(D), five times) communication opportunities are obtained for the vehicle-to-vehicle communication 550 assigned to the vehicle-to-vehicle communication subframe 1550' in one wireless frame.

Figure 3:
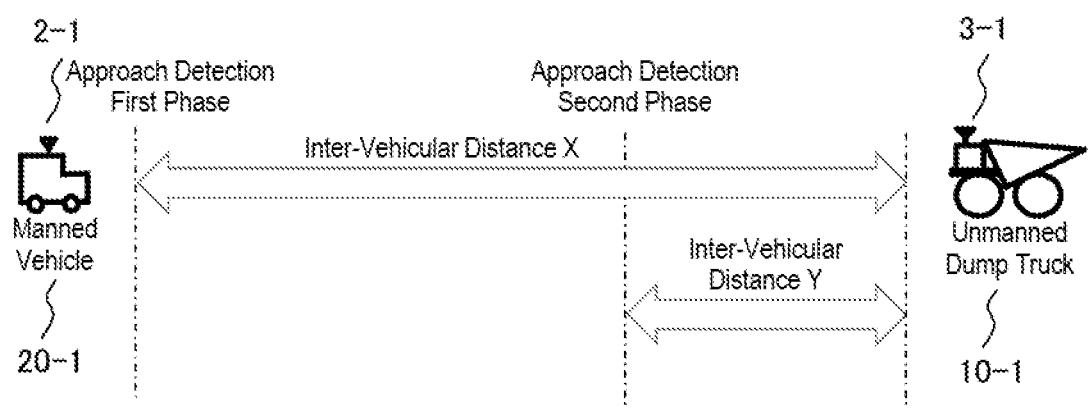
FIG. 3 is a schematic diagram illustrating an example of approach detection and an operation of emergency deceleration/stop in the vehicle control system 1000 according to the first embodiment.

FIG. 3 is a drawing illustrating an example of an approach detection and an operation of emergency deceleration/stop in the vehicle control system 1000 according to the first embodiment. The manned vehicle 20-1 usually obtains own location information from a GPS receiver (not illustrated) mounted on the manned vehicle 20-1 and transmits the location information in the road-to-vehicle communication 520 using the first communication method. A granularity of the location information using the first communication method is defined as a first granularity. The first granularity is, for example, in units of 10 m.

On the other hand, the unmanned dump truck 10-1 receives the location information of the manned vehicle 20-1 received from the manned vehicle 20-1 in the road-to-vehicle communication 520 using the first communication method. Using the own location information and the location information of the manned vehicle 20-1, the unmanned dump truck 10-1 can obtain the vehicle-to-vehicle distance between the unmanned dump truck 10-1 and the manned vehicle 20-1.

The unmanned dump truck 10-1 determines whether the vehicle-to-vehicle distance from the manned vehicle 20-1 is a predetermined inter-vehicular distance X or less in an approach detection first stage based on the location information having the first granularity received from the manned vehicle 20-1 by the first communication method. In a case where the vehicle-to-vehicle distance is determined to be the inter-vehicular distance X or less, the unmanned dump truck 10-1 instructs the manned vehicle 20-1 to transmit the location information at a second granularity smaller than the first granularity in the road-to-vehicle communication 520 by the second communication method. When the manned vehicle 20-1 receives the instruction from the unmanned dump truck 10-1, the manned vehicle 20-1 uses the second communication method to transmit own location information at the second granularity in the vehicle-to-vehicle communication 550 using the vehicle-to-vehicle communication subframe 1550.

The unmanned dump truck 10-1 determines whether the vehicle-to-vehicle distance from the manned vehicle 20-1 determined according to at least one of the distance obtained based on the location information transmitted at the first granularity or a distance obtained based on the location information transmitted at the second granularity is a predetermined inter-vehicular distance Y or less in an approach detection second phase. In a case where the vehicle-to-vehicle distance is determined to be the inter-vehicular distance Y or less, the unmanned dump truck 10-1 decelerates or stops. Here, using the mutual location information, the unmanned dump truck 10-1 can obtain the vehicle-to-vehicle distance between the unmanned dump truck 10-1 and the manned vehicle 20-1, namely, the communication distance of the vehicle-to-vehicle distance.

The system performs the vehicle-to-vehicle communication using the communication method (the modulation scheme and the code rate) obtained from the predetermined vehicle-to-vehicle distance X defined in the approach detection first stage or a propagation loss corresponding to the communication distance. This allows transmitting the highly accurate location information at high frequency. Note that when a wireless system, such as a mobile phone and Wi-Fi, is used in a city, since a reflection object, such as a building and a structure, is present, uniquely determining the propagation loss from the communication distance is generally difficult. However, since the reflection object is reduced in the mine compared with the city, the propagation loss is easily obtained from the communication distance. Note that the method of obtaining the propagation loss from the communication distance is not limited to a specific method, but the use of a free space model in a square law of the distance generally used allows obtaining the propagation loss from the communication distance. Additionally, there is no restriction on the modulation scheme, and all of a spread spectrum modulation scheme, a frequency hopping scheme, and an Orthogonal Frequency Division Multiplexing (OFDM) scheme are applicable.

FIG. 4 is a table showing an example of selectable modulation scheme and code rate thereof and a communication speed ratio for each communication distance. The communication speed ratio shown in FIG. 4 means a communication speed ratio with a communication speed when the QPSK modulation scheme and the code rate of ⅓ are selected as criteria.

For example, in the first communication method, communications at the communication distance exceeding 1 km need to be assumed in the road-to-road communication 510 and the road-to-vehicle communication 520. In view of this, for example, the communication method of the QPSK modulation scheme and the code rate of ⅓ are selectable as the first communication method.

On the other hand, in the second communication method, the vehicle-to-vehicle distance may be 100 m, for instance. In view of this, the communication method of the 64 QAM modulation scheme and the code rate of ⅚ are selectable as the second communication method. In this case, the communication speed of 64 QAM (the code rate: ⅚) selected in the second communication method is ten times (the communication speed ratio is 10) of the communication speed in the QPSK modulation scheme (the code rate: ⅓) selected in the first communication method.

Figure 5:
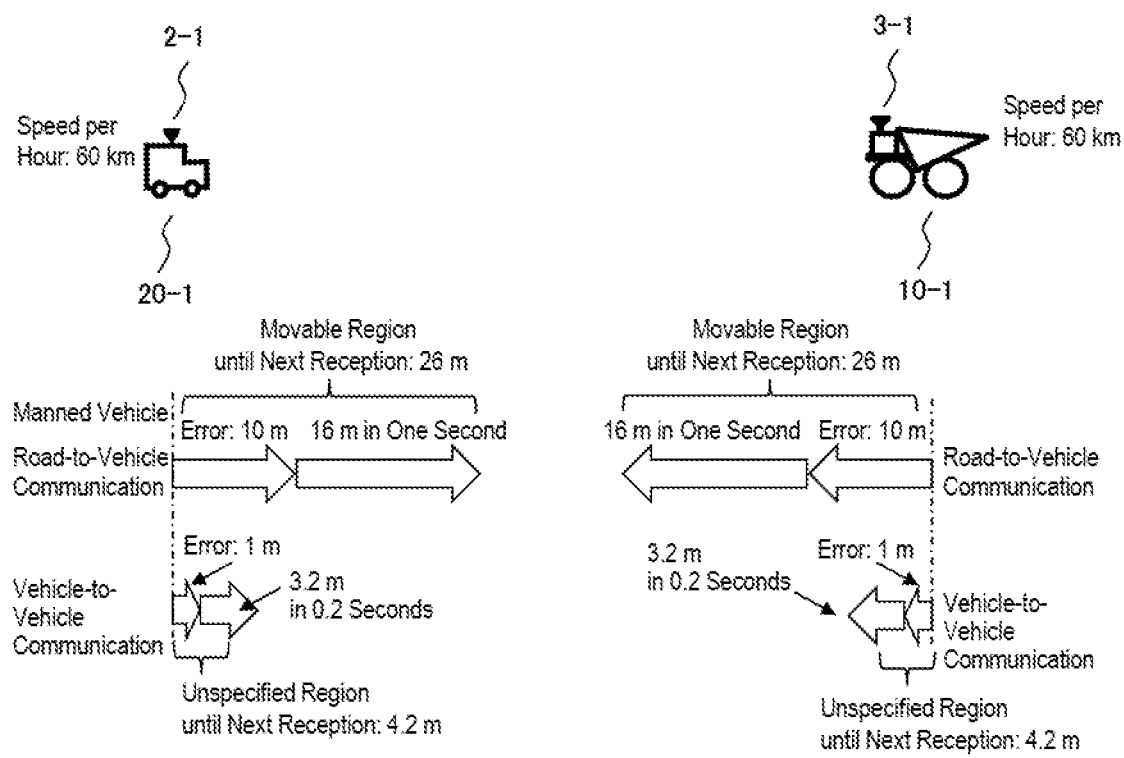
FIG. 5 is a conceptual diagram that compares and verifies differences in ranges that an unmanned vehicle 10-1 and a manned vehicle 20-1 possibly move (movable regions) until a timing of next acquisition of location information between a case where the location information is transmitted and received by a first communication method at a first granularity and a case where the location information is transmitted and received by a second communication method at a second granularity.

Next, with reference to the conceptual diagram in FIG. 5, differences in ranges that the unmanned vehicle 10-1 and the manned vehicle 20-1 possibly move (the movable regions) until a timing of the next acquisition of location information between a case where the location information is transmitted and received by the first communication method at the first granularity and a case where the location information is transmitted and received by the second communication method at the second granularity are compared and verified. Here, it is assumed that a moving speed of the unmanned dump truck 10-1 is 60 km per hour and a moving speed of the manned vehicle 20-1 is similarly 60 km per hour. It is assumed that the first granularity by the first communication method is 10 m and a transmission frequency is one time in one second (one time/second). It is assumed that the second granularity by the second communication method is 1 m and a transmission frequency is one time in 0.2 seconds (five times/second).

In this case, when the first communication method having the first granularity is used, an error of the granularity of the location information of the respective unmanned dump truck 10-1 and manned vehicle 20-1 is 10 m, and the transmission frequency is one time in one second (one time/second). In view of this, the unmanned dump truck 10-1 and the manned vehicle 20-1 advance by 16 m until the next acquisition (after one second) of the location information (the speed per hour: 60 km). A region that the unmanned dump truck 10-1 and the manned vehicle 20-1 possibly move (the movable region) until the timing of the next acquisition (after one second) of the location information becomes a circle with a radius of 26 m.

On the other hand, when the second communication method having the second granularity is used, an error of the granularity of the location information of the respective unmanned dump truck 10-1 and manned vehicle 20-1 is 1 m, and the transmission frequency is one time in 0.2 seconds (five times/second). In view of this, the unmanned dump truck 10-1 and the manned vehicle 20-1 advance by only 3.2 m until the next acquisition (after 0.2 seconds) of the location information (the speed per hour: 60 km). A region that the unmanned dump truck 10-1 and the manned vehicle 20-1 possibly move (the movable region) until the next acquisition (after 0.2 seconds) of the location information becomes a circle with a radius of 4.2 m, which is considerably smaller than the case of the first communication method.

As the region in which the vehicles possibly move until the next acquisition of the location information decreases, the inter-vehicular distance Y in the approach detection second phase can be shortened. It is possible to shorten a period during which the unmanned dump truck 10-1 decelerates and operates or to reduce the number of unnecessary stops, thus allowing significantly improving productivity of the system.

Figure 6:
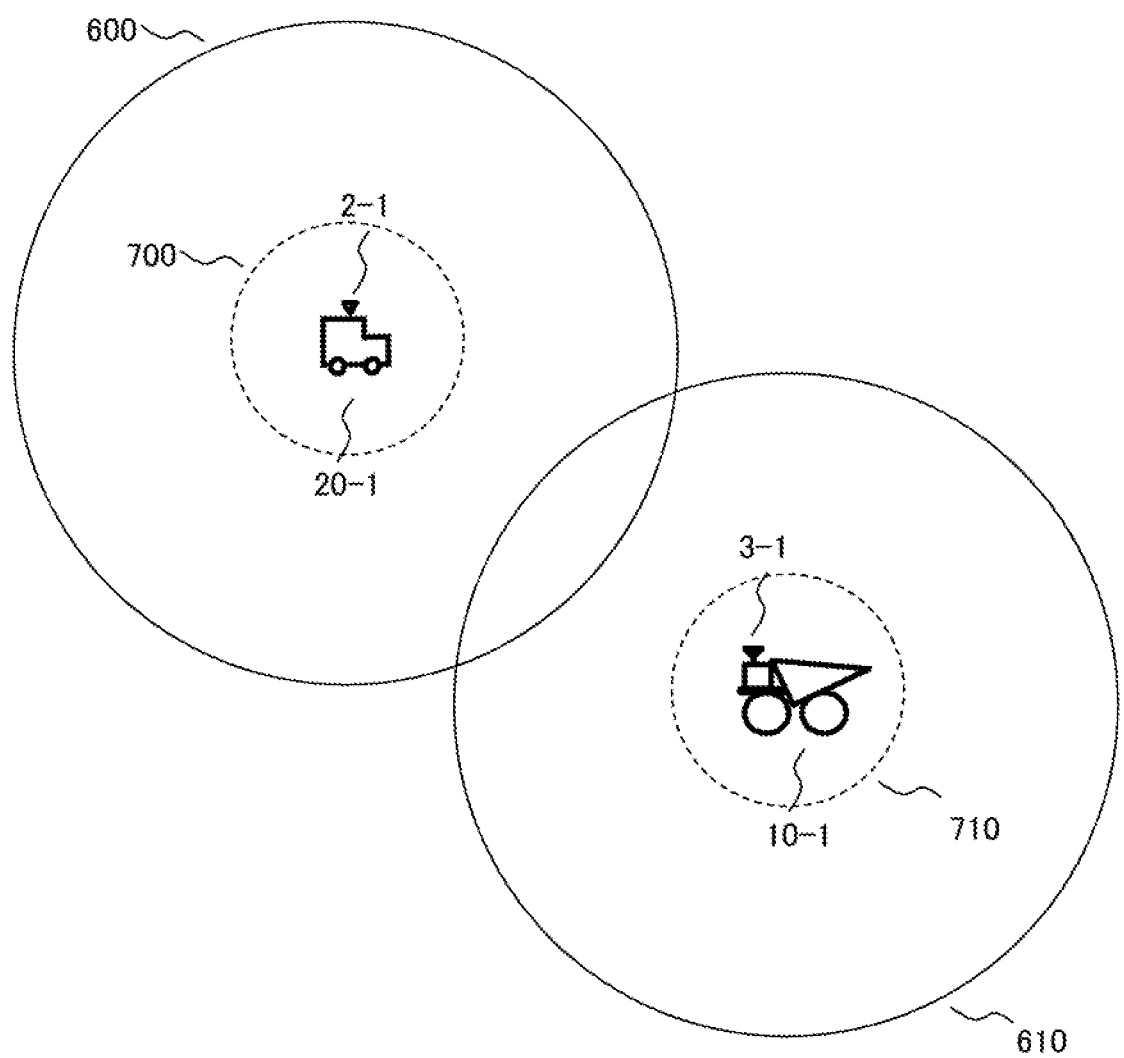
FIG. 6 is a schematic diagram illustrating the movable regions illustrated in FIG. 5.

FIG. 6 is a schematic diagram illustrating the above-described movable regions. FIG. 6 illustrates a movable region 600 until the next acquisition of the location information of the manned vehicle 20-1 and a movable region 610 until the next acquisition of the location information of the unmanned dump truck 10-1 in the case where the first communication method having the first granularity is used. FIG. 6 illustrates a movable region 700 until the next acquisition of the location information of the manned vehicle 20-1 and a movable region 710 until the next acquisition of the location information of the unmanned dump truck 10-1 in the case where the second communication method having the second granularity is used.

Note that, in the description of this embodiment, a method for determining whether the unmanned dump truck 10 and the manned vehicle 20 are decelerated and a method for determining whether to stop are not limited to specific methods. As apparent from FIG. 6, significantly narrowing the movable region until the next acquisition of the location information allows shorting the deceleration time and allows suppressing unnecessary stops. Specifically, by switching the communication method, the movable regions can be switched from the large regions 600 and 610 to the small regions 700 and 710. This allows reducing a possibility of the emergency deceleration/stop of the unmanned dump truck 10-1 and improving efficiency in the mining work in the mine.

As described above, according to the vehicle control system of the first embodiment, while the unmanned dump truck 10 and the manned vehicle 20 communicate in the first communication method at the first granularity at the beginning, when the distance between both is determined to be a first inter-vehicular distance threshold or less, the unmanned dump truck 10 instructs the manned vehicle 20 to transmit the location information at the second granularity smaller than the first granularity in the second communication method different from the first communication method. When the manned vehicle 20 receives the instruction to transmit the location information using the second communication method at the second granularity from the unmanned dump truck 10, the manned vehicle 20 transmits the location information using the second communication method at the second granularity. Transmission of the location information at the second granularity by the second communication method suppresses the unnecessary deceleration of the unmanned dump truck 10 and the unmanned dump truck 10 being the target for stop. Therefore, according to the first embodiment, the vehicle control system that can achieve both of ensuring safety and improvement in productivity can be provided. Note that, while the control that decelerates or stops the unmanned dump truck 10 in case of emergency has been described above, instead of the deceleration or the stop, for example, control that causes the unmanned dump truck 10 to bypass to a bypass route can be performed. That is, as long as a method to avoid a collision of the unmanned dump truck 10 with another vehicle or the like in case of emergency is taken, the method for avoiding the collision is not limited to the specific method.

Second Embodiment

Next, a vehicle control system according to the second embodiment will be described with reference to FIG. 7 to FIG. 11. The overall configuration and the overall operation of the vehicle control system according to the second embodiment are approximately the same as those of the first embodiment, and therefore the overlapping descriptions are omitted. However, the second embodiment differs from the first embodiment in details of an operation of switching the first communication method to the second communication method. Specifically, in the second embodiment, when the vehicle-to-vehicle distance at the first stage between the manned vehicle 20 and the unmanned dump truck 10 is X or less, the vehicle-to-vehicle communication starts between the manned vehicle 20 and the unmanned dump truck 10 in principle, and the communication starts by the second communication method having the second granularity. However, during the switching, a priority described later is considered, and the unmanned dump truck 10 having the higher priority is preferentially switched to the second communication method over the unmanned dump truck 10 having the low priority. In other words, an individual priority is provided to each of the plurality of unmanned dump trucks 10 as the autonomous traveling vehicles regarding the vehicle-to-vehicle communication. Note that the priority can be determined in, for example, the control center 30.

There may be a case where a data amount of the vehicle-to-vehicle communication 550 assigned to the vehicle-to-vehicle communication subframe 1550 exceeds a communication capacity at which transmission with the vehicle-to-vehicle communication subframe 1550 is possible. In other words, since a wireless resource (the number of assigned lines) of the vehicle-to-vehicle communication 550 assigned to the vehicle-to-vehicle communication subframe 1550 is finite, the vehicle-to-vehicle communication 550 between all of the manned vehicles 20 and the unmanned dump trucks 10 is not always possible with the vehicle-to-vehicle communication subframe 1550. Therefore, when the data amount exceeds the communication capacity, the system according to the second embodiment follows the priority order determined according to a predetermined condition and assigns the vehicle-to-vehicle communication subframe 1550 to the vehicle-to-vehicle communication 550. While the vehicle-to-vehicle communication by the second communication method using the vehicle-to-vehicle communication subframe 1550 starts in the unmanned dump truck 10 in a situation of high priority, the vehicle-to-vehicle communication is not performed in the unmanned dump truck 10 in a situation of low priority, and control by the road-to-vehicle communication is possibly continued ongoingly.

When the priority is determined to be high in the situation based on the location information of the unmanned dump truck 10 and the map information determined from the location information, information on the traveling state of the unmanned dump truck 10, load loading information of the unmanned dump truck 10, and other various kinds of information regarding mining in a mine, the vehicle-to-vehicle communication subframe 1550 can be preferentially assigned to the unmanned dump truck 10.

Figure 7:
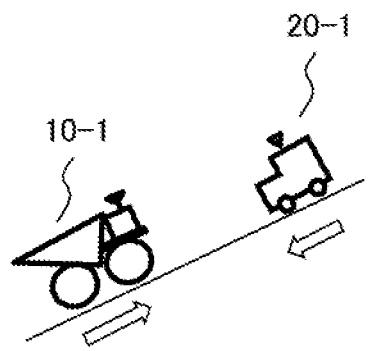
FIG. 7 is a conceptual diagram that describes giving a priority.

For example, as illustrated in FIG. 7, assume that while the unmanned dump truck 10-1 approaches the manned vehicle 20-1 on the track 100, the unmanned dump truck 10-1 travels on an ascending slope, and on the other hand, the manned vehicle 20-1 travels on a descending slope. In this case, deceleration and stop of the unmanned dump truck 10-1 in case of emergency are easy, the risk is determined to be low, and avoiding the deceleration and the stop as much as possible is desirable from the aspect of efficient mining work in the mine. In view of this, the system of the second embodiment gives the high priority to the unmanned dump truck 10-1 in the situation as in FIG. 7, and when the first inter-vehicular distance X is detected, the vehicle-to-vehicle communication 550 is preferentially started in the unmanned dump truck 10-1, and the vehicle-to-vehicle distance is obtained by the second communication method at the second granularity. This allows further minute deceleration determination or stop determination, and therefore the deceleration time or the unnecessary stop of the unmanned dump truck 10-1 can be reduced and the productivity can be improved.

Figure 8:
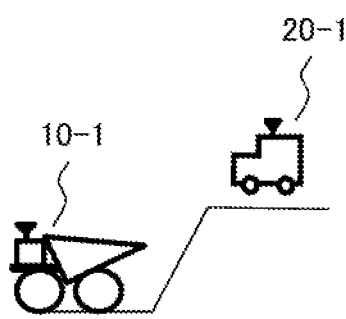
FIG. 8 is a conceptual diagram that describes giving the priority.

As illustrated in FIG. 8, assume that while the unmanned dump truck 10-1 approaches the manned vehicle 20-1 on the track 100, the unmanned dump truck 10-1 and the manned vehicle 20-1 travel different courses with a difference in height. Especially, in a case where the manned vehicle 20-1 is at a position higher than the unmanned dump truck 10-1, the risk is determined to be low. In view of this, in the system of the second embodiment, the high priority is given to the unmanned dump truck 10-1 in the situation as in FIG. 8. When the first inter-vehicular distance X is detected between the unmanned dump truck 10-1 and the manned vehicle 20-1 as in FIG. 8, the vehicle-to-vehicle communication 550 is preferentially started in the unmanned dump truck 10-1 and the vehicle-to-vehicle distance is obtained by the second communication method at the second granularity. This allows further minute deceleration determination or stop determination, and therefore the deceleration time or the unnecessary stop of the unmanned dump truck 10-1 can be reduced and the productivity can be improved. Note that the height of the vehicle can be determined from the location information obtained by, for example, a GPS receiver 109.

Figure 9:
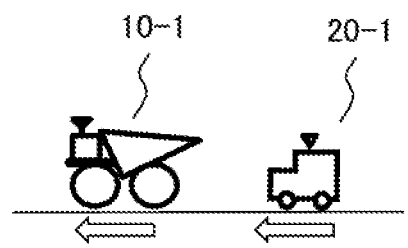
FIG. 9 is a conceptual diagram that describes giving the priority.
Figure 10:
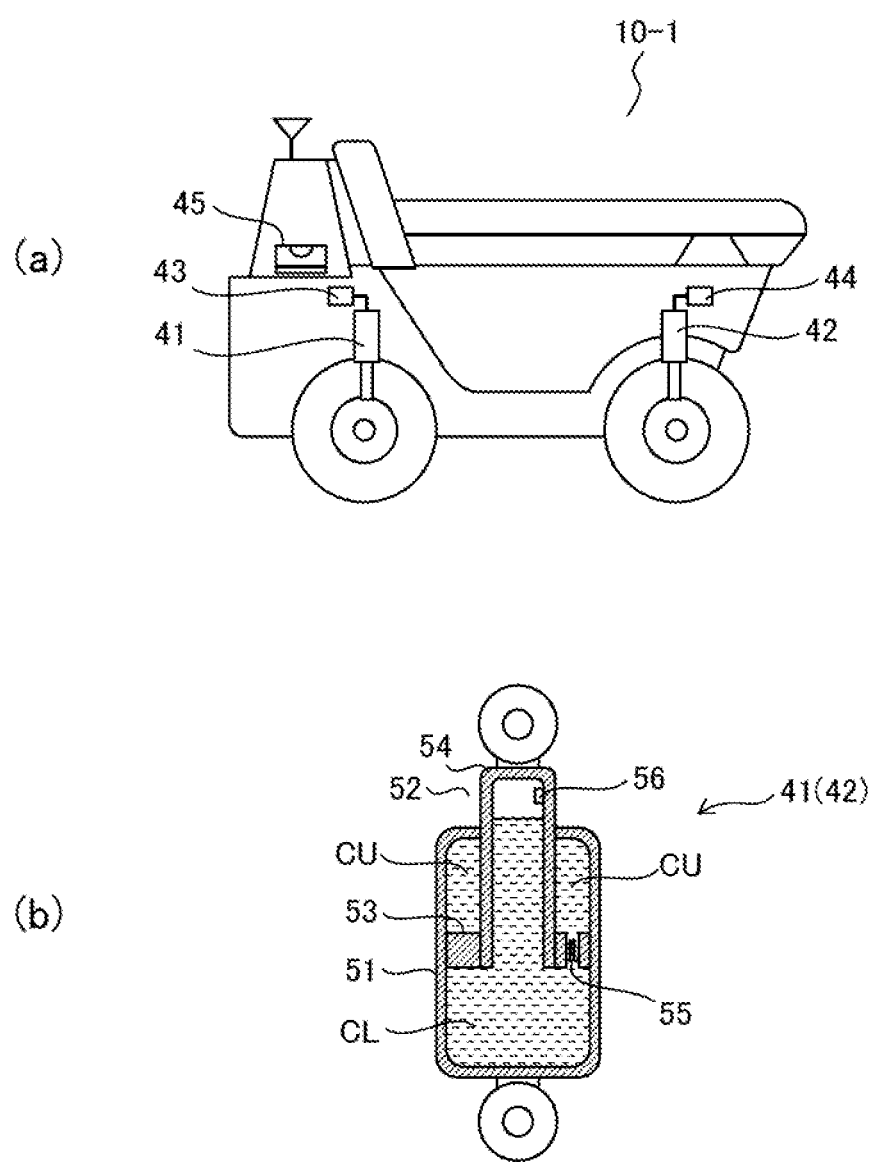
FIGS. 10(a) and 10(b) illustrate one example of configurations of an unmanned dump truck 10-1 capable of is measuring a loaded weight of a load and suspension cylinders 41 and 42.

As illustrated in FIG. 9, assume that while the unmanned dump truck 10-1 approaches the manned vehicle 20-1 on the same track 100, the manned vehicle 20-1 travels and tracks the unmanned dump truck 10-1. In this case, a relative speed between the unmanned dump truck 10-1 and the manned vehicle 20-1 is small, and the risk is determined to be low. In view of this, in the system of the second embodiment, the high priority is given to the unmanned dump truck 10-1 in the situation as in FIG. 9. When the first inter-vehicular distance X is detected between the unmanned dump truck 10-1 and the manned vehicle 20-1 as in FIG. 9, the vehicle-to-vehicle communication 550 is preferentially started in the unmanned dump truck 10-1 and the vehicle-to-vehicle distance is obtained by the second communication method at the second granularity. This allows further minute deceleration determination or stop determination, and therefore the deceleration time or the unnecessary stop of the unmanned dump truck 10-1 can be reduced and the productivity can be improved. Note that whether the above-described tracking is performed can be determined from, for example, the location information obtained by an own position estimating device, such as a GPS receiver, included in each vehicle.

In a case where a loaded weight of the load loaded on the unmanned dump truck 10-1 is large, the priority can be set to high compared with a case where the unmanned dump truck 10-1 does not load any load or the loaded weight is small. FIG. 10(a) illustrates an example of a configuration of the unmanned dump truck 10-1 capable of measuring the loaded weight of the load. The unmanned dump truck 10-1 includes suspension cylinders 41 and 42 on a front wheel tire and a rear wheel tire, respectively. Note that the suspension cylinder 41 can be disposed on each of the two front wheel tires, and the suspension cylinder 42 can be disposed on each of the two rear wheel tires. That is, the suspension cylinder 41 or 42 can be installed on each of the four front and rear tires by four in total. To the suspension cylinders 41 and 42, pressure sensors 43 and 44 to measure loads applied on the respective cylinders are disposed. According to detection outputs from the pressure sensors 43 and 44, the weight of the load is allowed to be measured, and the priority is allowed to be determined. In addition to the pressure sensors 43 and 44, an inclination sensor 45 to measure an inclination of the unmanned dump truck 10-1 may be disposed. The inclination sensor 45 allows measuring an inclination of the track on which the unmanned dump truck 10-1 travels.

As illustrated in FIG. 10(b), the suspension cylinders 41 and 42 include cylinders 51 supported to rotation shafts of the tires and pistons 52 supported to a vehicle body. The piston 52 includes a piston body 53 that vertically slides inside the cylinder 51 and a piston pipe 54 connected to the piston body 53. The piston body 53 partitions the cylinder 51 into an upper chamber CU and a lower chamber CL. Oil can flow through between the upper chamber CU and the lower chamber CL via an orifice 55 formed in the piston body 53.

A nitrogen gas is sealed to the inside of the piston pipe 54 communicating with the lower chamber CL together with oil. A pressure sensor 56 disposed in the proximity of the upper end inside the piston pipe 54 measures a pressure of the nitrogen gas. The detected pressure by the pressure sensor 56 allows measuring the loaded weight of the load on the unmanned dump truck 10-1.

As illustrated in FIG. 11, the above-described priority may be determined according to not only one element but the sum of a plurality of elements. The example of FIG. 11 is calculation of the priorities by the total points of whether the track 100 is different or the same, whether the unmanned dump truck 10-1 is at the unloading site 300, whether the unmanned dump truck 10-1 is travelling on an ascending slope, whether the manned vehicle 20-1 is tracking the unmanned dump truck 10-1, and whether the loaded weight of the load on the unmanned dump truck 10-1 is a predetermined value or more. The vehicle-to-vehicle communication and the second communication method are assigned to the unmanned dump truck 10 to which the high priority is given preferentially over the unmanned dump truck 10 to which the priority lower than that is given. Thus, the vehicle-to-vehicle communication is assigned to the unmanned dump truck 10 within a range not exceeding the communication capacity of the vehicle-to-vehicle communication subframe 1550. For example, assuming that the vehicle-to-vehicle communication subframe 1550 allows up to three lines for transmission, in the case of FIG. 10, the vehicle-to-vehicle communication subframe 1550 is assigned to the unmanned dump trucks 10 having the top three priorities. Note that whether the unmanned dump truck 10 is travelling on an ascending slope may be determined, for example, from inclination information obtained from the inclination sensor 45 or can be determined from a change in the location information obtained by the GPS receiver 109 mounted on the vehicle.

Regarding the unmanned dump truck 10 and the manned vehicle 20 in which the vehicle-to-vehicle communication 550 is not assigned to the vehicle-to-vehicle communication subframe 1550, due to the low priorities, deceleration determination or the stop determination is continuously performed, using the road-to-road communication 510 and the road-to-vehicle communication 520, and according to the vehicle-to-vehicle distance obtained from the location information by the first communication method at the first granularity. With the vehicle-to-vehicle distance obtained from the location information by the first communication method at the first granularity using the road-to-road communication 510 and the road-to-vehicle communication 520, safety is protected. On the other hand, in a case where the deceleration determination or the stop determination can be performed with the vehicle-to-vehicle distance obtained from the location information in the second communication method at the second granularity using the vehicle-to-vehicle communication 550, improvement in productivity can be expected.

Note that whether the unmanned dump truck 10 is in the above-described situation or not can be determined from any information including the above-described GPS receiver, the map information, the detected pressure by the pressure sensor 56, and an image processing result by a television camera (not illustrated).

Note that the control center 30 and the control base station 5 preferably determine the priority orders based on various kinds of information and instruct the corresponding unmanned dump truck 10 and manned vehicle 20 to start the vehicle-to-vehicle communication 550.

[Exemplary Configuration of Manned Vehicle Mounted Communication Terminal 2]

Figure 12:
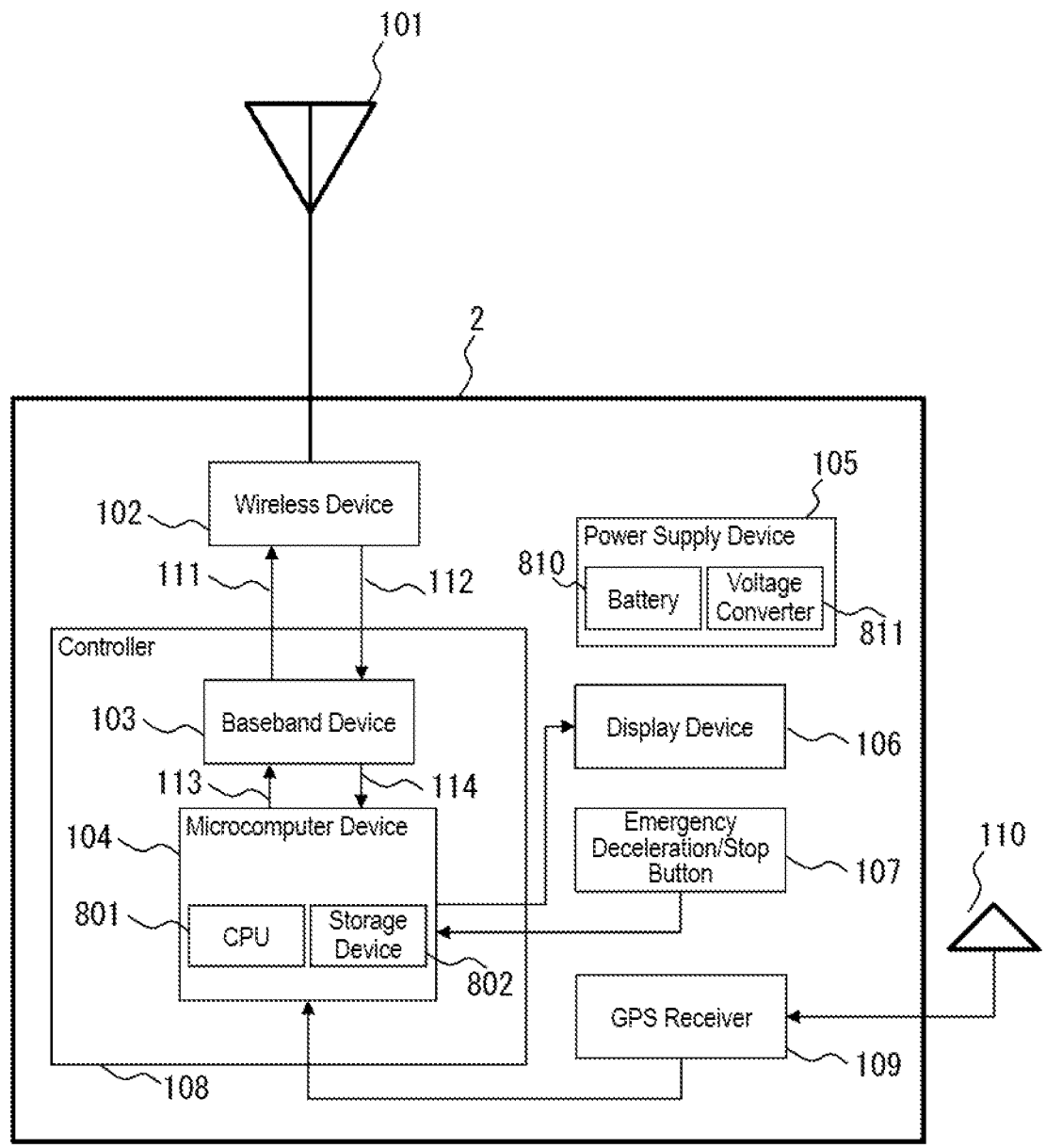
FIG. 12 is a block diagram illustrating an exemplary configuration of a manned vehicle mounted communication terminal 2.

The block diagram illustrated in FIG. 12 illustrates the exemplary configuration of the manned vehicle mounted communication terminal 2 according to the above-described embodiments. As one example, the manned vehicle mounted communication terminal 2 includes a transmission/reception antenna 101, a wireless device 102, a power supply device 105, a display device 106, an emergency deceleration/stop button 107, a controller 108, the GPS receiver 109, and a GPS antenna 110. The controller 108 includes a microcomputer device 104 and a baseband device 103. The wireless device 102 may have a function of the baseband device 103.

The power supply device 105 includes a battery 810, a voltage converter 811, and the like. The power supply device 105 has a function that converts a power supply supplied from the battery 810 into a required voltage by the voltage converter 811, and after that supplies the voltage to each unit in the manned vehicle mounted communication terminal 2.

The display device 106 includes, for example, an LED and a liquid crystal display device and is connected to the power supply device 105 and the microcomputer device 104. The display device 106 has a function that notifies an operational personnel of normality of the power supply and an out-of-range determination result of the wireless area.

The emergency deceleration/stop button 107 is connected to the microcomputer device 104 in the controller 108 and includes an operating button to instruct the emergency deceleration or stop of the unmanned dump truck 10-1 by the operational personnel. Similarly to the emergency deceleration/stop input device 32 in the control center 30, the emergency deceleration/stop button 107 is to instruct the emergency deceleration or stop of the unmanned dump truck 10-1, but is disposed in the manned vehicle mounted communication terminal 2. The emergency deceleration/stop button 107 can be a pressing button structure that detects the instruction by the operational personnel from the pressing operation. The emergency deceleration/stop button 107 preferably includes a mechanism in which the emergency deceleration/stop button 107 is locked when pressed and is continuously pressed unless the lock is released.

The GPS receiver 109 is connected to the GPS antenna 110 and the microcomputer device 104 in the controller 108 and obtains the location information representing the current location of the manned vehicle 20 from a GPS reception signal received via the GPS antenna 110. The GPS receiver 109 periodically (for example, in units of one second) outputs the location information representing the current location of the manned vehicle 20 to the microcomputer device 104.

The microcomputer device 104 in the controller 108 is a microcomputer connected to the display device 106, the emergency deceleration/stop button 107, the baseband device 103, and the GPS receiver 109, and includes CPU 801 as a processing unit and a storage device 802, such as a main memory and a flash memory. Calculation of a program stored in the storage device 802 by the CPU 801 achieves functions described later. A part of or all of the microcomputer device 104 may be configured of, for example, an integrated circuit. In addition to the above-described function, the microcomputer device 104 performs determination whether the power supply device 105 normally operates and out-of-range determination whether the manned vehicle 20 is present within the range of the wireless area formed by the respective relay base stations 4 and the control base station 5. Note that as the microcomputer device 104, using a microcomputer suitable for functional safety is preferred, and microcomputer meeting safety standards, such as Safety Integrity Level (SIL), is preferred.

The baseband device 103 in the controller 108 is a unit that includes, for example, an integrated circuit, and communicates with another device in accordance with Time division multiplexing scheme. The baseband device 103 outputs signals in a preliminarily assigned subframe or a subframe assigned to its own machine by a road-to-road communication 510 among the respective subframes in which a predetermined unit time (for example, one second) is divided into plural. The baseband device 103 controls the wireless device 102 according to the control from the microcomputer device 104 such that the wireless device 102 transmits the signal in the subframe assigned to own machine.

The wireless device 102 performs processes, such as error correction coding, modulation, frequency conversion, filtering, and amplification, on data output from the baseband device 103 based on the control by the baseband device 103 and generates a wireless signal. The wireless device 102 transmits the generated wireless signal to the transmission/reception antenna 101.

Figure 13:
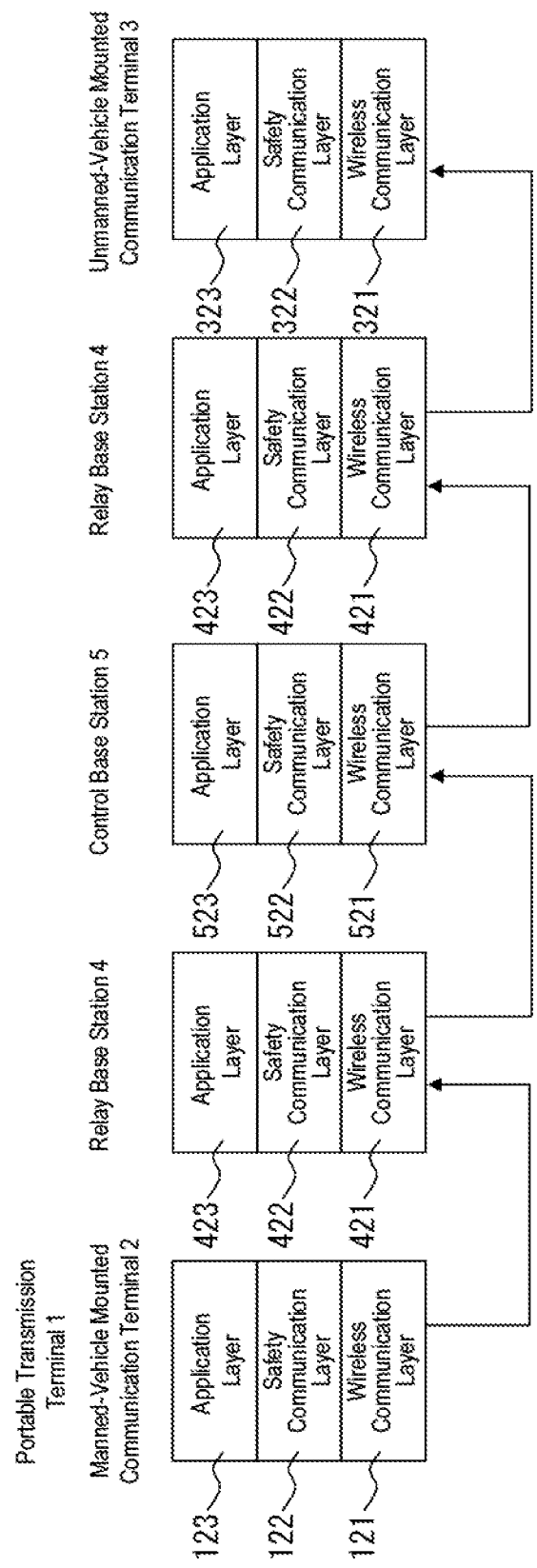
FIG. 13 is a schematic diagram describing communication protocol stacks used in the vehicle control system 1000.

Here, with reference to FIG. 13, communication protocol stacks used in the vehicle control system 1000 will be described. FIG. 13 is a drawing illustrating an example of the communication protocol stacks of the portable transmission terminal 1, the manned vehicle mounted communication terminal 2, the unmanned vehicle mounted communication terminal 3, the relay base stations 4, and the control base station 5.

The portable transmission terminal 1, the manned vehicle mounted communication terminal 2, the unmanned vehicle mounted communication terminal 3, the relay base stations 4, the control base station 5 mutually transmit and receive data constituted of the protocol stacks of wireless communication layers, safety communication layers, and application layers.

The wireless communication layer is a layer defined by a communication profile for the purpose of communication connection and communication maintenance as wireless communication and is a layer for controlling a wireless communication function based on it. The safety communication layer is a layer defined by a communication profile for the purpose of functional safety as safety communication and is a layer for controlling a safety communication function based on it. The application layer is a layer in charge of a user interface with the operational personnel.

When the portable transmission terminal 1, the manned vehicle mounted communication terminal 2, the unmanned vehicle mounted communication terminal 3, the relay base stations 4, and the control base station 5 communicate with one another, the communication connection and the communication maintenance are achieved based on the communication profile for each layer. For example, in communication between the manned vehicle mounted communication terminal 2 and the relay base station 4, a wireless communication layer 121 of the manned vehicle mounted communication terminal 2 and a wireless communication layer 421 of the relay base station 4 perform communication connection using a format that can be mutually recognized. A safety communication layer 122 of the manned vehicle mounted communication terminal 2 and a safety communication layer 422 of the relay base station 4 similarly perform communication connection using a format that can be mutually recognized. An application layer 123 of the manned vehicle mounted communication terminal 2 and an application layer 423 of the relay base station 4 similarly perform communication connection using a format that can be mutually recognized. Note that target data to be transmitted/received is capsuled and decapsulated every time crossing the respective layers.

The microcomputer device 104 in the controller 108 illustrated in FIG. 12 performs the functions provided by the application layer 123 and the safety communication layer 122 in FIG. 13. As the function of the application layer 123, the microcomputer device 104 generates the emergency deceleration/stop signal indicative of whether the emergency deceleration/stop button 107 is pressed and the location information indicative of a current own location transmitted from the GPS receiver as transmission data. The microcomputer device 104 transfers the generated transmission data to the safety communication layer 122, which is the lower layer.

In addition, as the function of the safety communication layer 122, the microcomputer device 104 gives control information described later to the transmission data transferred from the application layer 123. With the control information, a transmission process based on the communication profile for the purpose of performing the functional safety. The transmission process is a process for performing, for example, safety measures against any of or all of menaces of data corruption, repetition, illegal order, missing, delay, insertion, impersonation, and misdirection.

Figure 14:
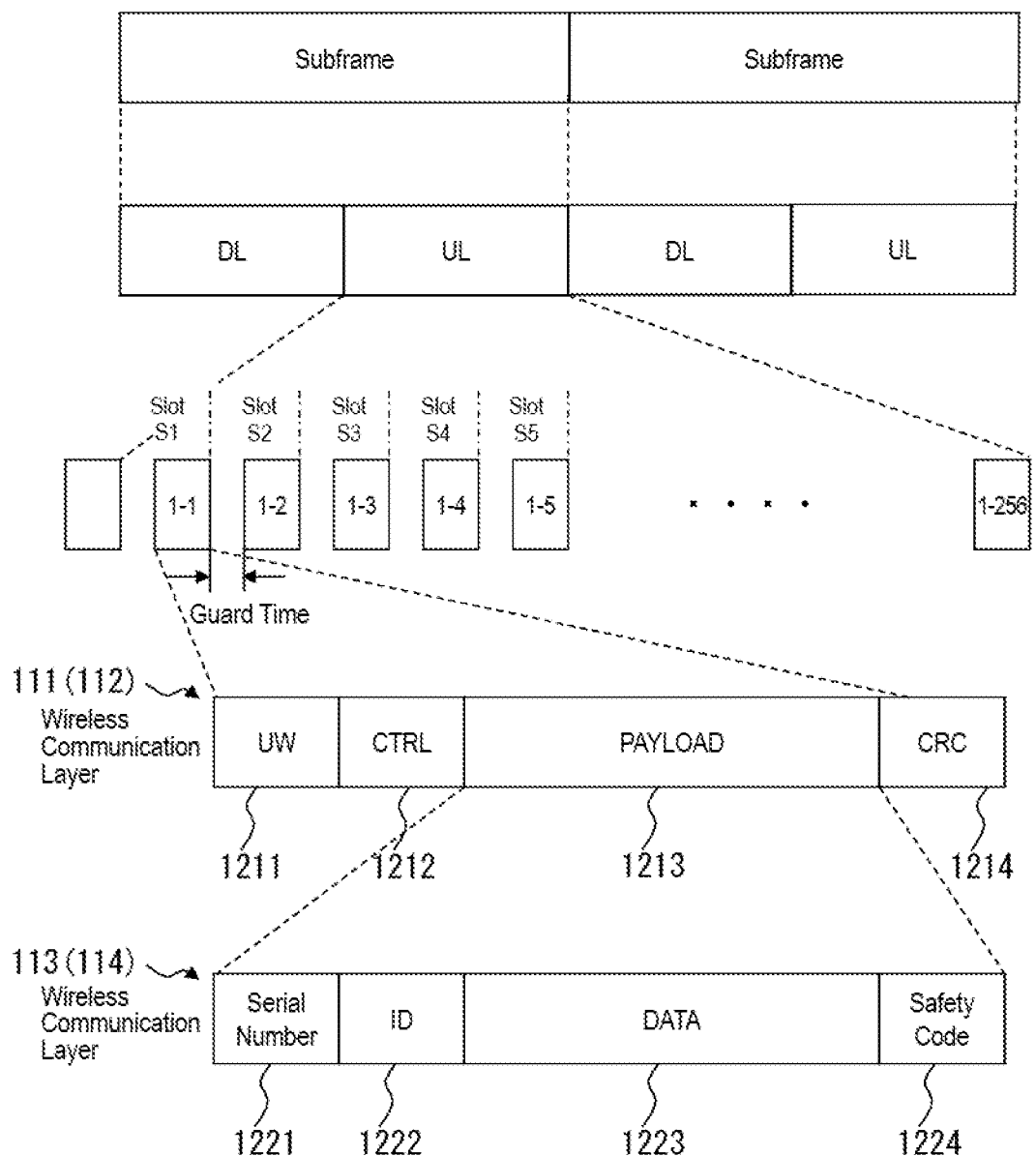
FIG. 14 is a drawing illustrating an example of data formats of a safety communication layer and a wireless communication layer.

FIG. 14 is a drawing illustrating an example of the data formats of the safety communication layer and the wireless communication layer. The transmission data including the emergency deceleration/stop signal and the location information generated in the application layer 123 becomes DATA 1223 in the safety communication layer. A serial number 1221, an ID 1222, and a safety code 1224 are given to the transmission data transmitted as the DATA 1223 as safety measures for the purpose of the functional safety. The serial numbers 1221 are sequential numbers (sequence numbers) managed by the portable transmission terminal 1 and the manned vehicle mounted communication terminal 2 at the transmission sides in own machines. The ID 1222 is identification information for uniquely identifying the portable transmission terminal 1 and the manned vehicle mounted communication terminal 2 as the transmission sides. The safety code 1224 is a code for performing safety measures against a menace, such as the above-described data corruption, repetition, illegal order, missing, delay, insertion, impersonation, and misdirection.

The microcomputer device 104 gives the control information to the DATA 1223, generates safety communication transmission data 113, and outputs it to the baseband device 103. Note that the data format of the safety communication layer in FIG. 14 is merely an example and a data format is not limited to this. The baseband device 103 in the controller 108 illustrated in FIG. 12 has the function of the wireless communication layer 121 illustrated in FIG. 13. The baseband device 103 performs processes based on the communication profile for the purpose of the wireless communication connection and the communication maintenance on the safety communication transmission data 113 generated in the safety communication layer 122 in the wireless communication layer 121.

As illustrated in FIG. 14, in the wireless communication layer 121, the safety communication transmission data 113 becomes a PAYLOAD 1213, a Unique Word (UW) 1211 for the purpose of connection and maintenance of communication, a Control (CTRL) 1212, and a Cyclic Redundancy Code (CRC) 1214 to detect data error are given to generate wireless communication transmission data 111. The wireless communication transmission data 111 is divided into a plurality of slots S for transmission. Note that the data format of the wireless communication layer in FIG. 14 is merely an example, and the data format is not limited to this.

The wireless communication transmission data 111 generated in the wireless communication layer 121 is adjusted in timing for allowing to be transmitted with a predetermined subframe and subsequently transmitted to the wireless device 102. The wireless device 102 performs processes, such as modulation, frequency conversion, filtering, and amplification, on the wireless communication transmission data 111 to generate the wireless signal and transmits the generated wireless signal to the transmission/reception antenna 101.

The transmission/reception antenna 101 emits the wireless signal generated in the wireless device 102 to the portable transmission terminal 1, the manned vehicle mounted communication terminal 2, the unmanned vehicle mounted communication terminal 3, the relay base station 4, and the control base station 5. The transmission/reception antenna 101 receives the wireless signal transmitted from the portable transmission terminal 1, the manned vehicle mounted communication terminal 2, the unmanned vehicle mounted communication terminal 3, the relay base station 4, and the control base station 5 and transmits the wireless signal to the wireless device 102. The wireless device 102 performs processes, such as amplification, filtering, frequency conversion, demodulation, and error correction decoding, on the wireless signal transmitted from the transmission/reception antenna 101 and generates baseband reception data 112. Note that a data format of the baseband reception data 112 is the same as that of the wireless communication transmission data 111 in FIG. 14.

As the function of the wireless communication layer 121, the baseband device 103 in the controller 108 performs a reception process based on the communication profile aiming to wireless communication connection and communication maintenance on the baseband reception data 112 generated in the wireless device 102 and generates safety communication reception data 114. Note that a data format of the safety communication reception data 114 is the same as that of the safety communication transmission data 113 in FIG. 14. The reception processes based on the communication profile aiming to the wireless communication connection and the communication maintenance is, for example, synchronization detection, synchronization maintenance, and error detection. After performing the processes, the baseband device 103 extracts the PAYLOAD 1213 in the baseband reception data 112, namely, the safety communication reception data 114. The baseband device 103 outputs the generate safety communication reception data 114 to the microcomputer device 104.

The microcomputer device 104 in the controller 108 performs a reception process based on the communication profile aiming to functional safety as the safety communication on the safety communication reception data 114 generated in the baseband device 103. Afterwards, the microcomputer device 104 generates DATA 1223 from the safety communication reception data 114. The DATA 1223 generated here is the reception data, and is response data and control data for the data of emergency deceleration/stop signal and the location information transmitted by itself. The configurations and the operations of the manned vehicle mounted communication terminal 2 have been described above with reference to FIG. 12 to FIG. 14, and the configurations and the operations of the portable transmission terminal 1 are approximately the same.

Figure 15:
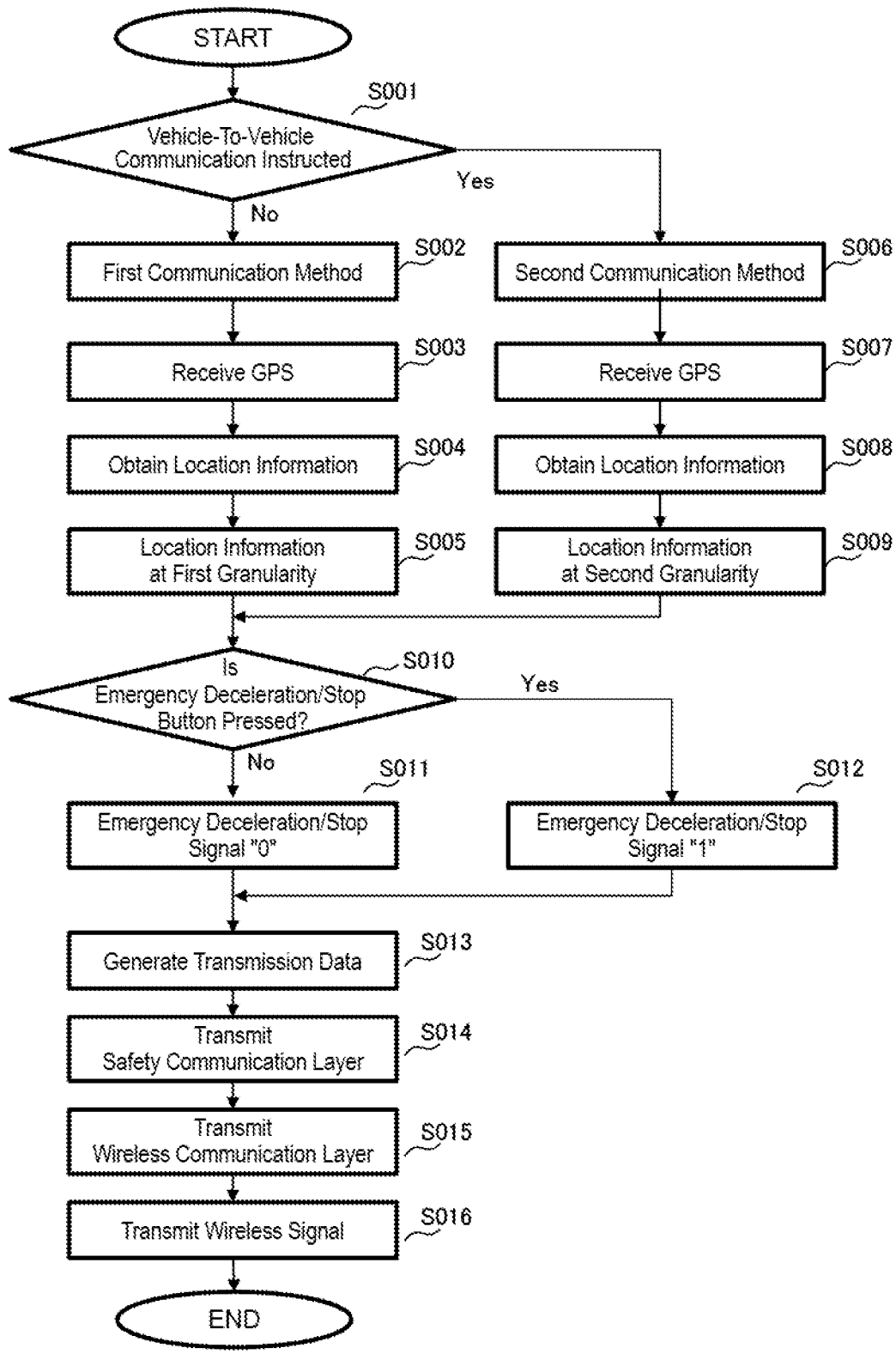
FIG. 15 is a flowchart depicting an operation of the manned vehicle mounted communication terminal 2.

Next, an operation of the manned vehicle mounted communication terminal 2 will be described in detail with reference to the flowchart of FIG. 15. The flowchart of FIG. 15 is assumed to be performed in units of a predetermined time (for example, one second or 0.2 seconds).

The unmanned dump truck 10 or the control base station 5 instructs the manned vehicle mounted communication terminal 2 to whether to perform the vehicle-to-vehicle communication 550 via the control communication 500 or the road-to-vehicle communication 520. When the instruction regarding the vehicle-to-vehicle communication 550 is not made (No at Step S001), a parameter is set such that the baseband device 103 in a portable transmission terminal 2 operates in the modulation scheme (the code rate) as the first communication method (Step S002). For example, a QPSK modulation scheme (the code rate: 1/3) as the first communication method is set.

On the other hand, when the instruction regarding the vehicle-to-vehicle communication 550 is made (Yes at Step S001), the parameter is set such that the baseband device 103 in the manned vehicle mounted communication terminal 2 operates in the modulation scheme (the code rate) as the second communication method (Step S006). For example, the 64 QAM modulation scheme (the code rate=5/6) as the second communication method is set.

When the first communication method is set, subsequently, the GPS antenna 110 in the manned vehicle mounted communication terminal 2 receives a GPS signal (Step S003), and the GPS receiver 109 obtains the location information representing the current location of the manned vehicle 20 based on the GPS signal (Step S004). The microcomputer device 104 generates transmission data including the own location information at the first granularity (Step S005). Here, the first granularity is, for example, 10 m, which is coarser than the second granularity.

In the case of setting the second communication method as well, the operations same as those at Steps S003 and S004 are performed in Steps S007 and S008. The microcomputer device 104 generates the transmission data including the own location information at the second granularity (Step S009). Here, the second granularity is, for example, 1 m, which is finer than the first granularity. In a case where the own location information or the like is obtained by the second communication method having the second granularity, when the vehicle-to-vehicle distance is detected to have reached a vehicle-to-vehicle distance Y or less, the deceleration or stop process is performed on an unmanned dump track 0.

Subsequently, the process transitions to Step S010, and whether the emergency deceleration/stop button 107 is pressed is determined. When determined to be not pressed (No at Step S010), the microcomputer device 104 generates the emergency deceleration/stop signal "0" in the application layer 123 (Step S011). On the other hand, when determined to be the emergency deceleration/stop button 107 being pressed (Yes at Step S010), the microcomputer device 104 generates the emergency deceleration/stop signal "1" in the application layer 123 (Step S012). The microcomputer device generates the transmission data including the obtained location information and the emergency deceleration/stop signal (Step S013). After the transmission process required as the functional safety is performed on the generated transmission data in the safety communication layer 122, the generated transmission data is transmitted (Step S014). The baseband device 103 performs a transmission process required as the wireless communication on the received data in the wireless communication layer 121.

When the vehicle-to-vehicle communication is instructed, the data on which the transmission process has been performed is output to the wireless device 102 at a timing transmitted at the corresponding slot of the vehicle-to-vehicle communication subframe 1550 (Step S015). When the vehicle-to-vehicle communication is not instructed, the data is output to the wireless device 102 at a timing transmitted at the corresponding slot in the road-to-vehicle communication subframe 1520. The wireless device 102 performs processes, such as modulation, frequency conversion, filtering, and amplification on the data received from the baseband device 103 and outputs a confirmation response signal from the transmission/reception antenna 101 (Step S016). After termination of Step S016, when the vehicle-to-vehicle communication 550 is instructed (S001: Yes), it loops back to START in every 0.2 seconds, and when the vehicle-to-vehicle communication 550 is not instructed (S001: No), it loops back to START in every one second.

By looping back to START regardless of the presence/absence of the instruction of the vehicle-to-vehicle communication 550, the own location information is periodically transmitted, and while the emergency deceleration/stop button 107 is pressed (S010: Yes), the emergency deceleration/stop signal is sequentially transmitted as "1." When the emergency deceleration/stop button 107 is released (S010: No), the microcomputer device 104 transmits the emergency deceleration/stop signal as "0."

Note that, although omitted in FIG. 15, when the vehicle-to-vehicle communication 550 is instructed (S001: Yes), in addition to the generation of the location information by the second communication method at the second granularity and the transmission with the vehicle-to-vehicle communication subframe 1550, the location information may be generated by the first communication method at the first granularity and the transmission may be concurrently performed with the road-to-vehicle communication subframe 1520 (one-second unit).

When the vehicle-to-vehicle communication 550 is not instructed, the own location information is transmitted in the road-to-vehicle communication 520 by the first communication method having the first granularity and the emergency deceleration/stop signal is also transmitted. In the case of the first communication method, the emergency deceleration/stop is determined at the inter-vehicular distance X, and the determination result is transmitted to the unmanned dump truck 10 and the control base station 5, and therefore a problem does not occur in safety. On the other hand, when the vehicle-to-vehicle communication 550 is instructed, transmission of the highly-accurate own location information to the unmanned dump truck 10 or the control base station 5 at high frequency using the vehicle-to-vehicle communication is possible, the deceleration time or the unnecessary stop of the unmanned dump truck can be reduced, and the productivity can be improved.

Note that in this embodiment, field sizes, such as the serial number 1221 and the ID 1222 shown in FIG. 14, can be adjusted, and each of them can be a small size, for example, several bytes. For example, in a case where the number of terminals are 256 or less, the field for the ID is sufficient to be one byte (=256 bits), and when the values are permitted to be circulated in around half a day (43200 seconds), the serial number is sufficient to be two bytes (=65536 bits). As in this embodiment, by decreasing the size of the given control code (a header and a footer) and reducing the kinds of the control codes so as to be a simple configuration, an information volume transmittable in one time can be reduced, and a guard time can be provided long.

In this embodiment, the information (the content) to be input to the DATA 1223 shown in FIG. 14 is sufficient as long as at least the emergency deceleration/stop and the own location information are included, and therefore the capacity only needs to be around several tens of bytes. To transmit and receive the small-sized DATA 1223, when the control code has the large size, transmission efficiency of the content data is reduced. In this embodiment, the decrease in the size of the control code allows reducing the reduction in the transmission efficiency of the content data.

While the embodiments have been described with an example of the unmanned dump truck in a mine site together with the embodiments, similar control is applicable to, not limited to the unmanned dump truck in the mine, but to a manned dump truck, a construction machine in a construction site, or the like.

As described in detail above, according to this embodiment, while the deceleration time or the unnecessary stop of the unmanned dump truck that performs autonomous traveling can be reduced, the transport vehicle that moves at a high speed can be remotely stopped in case of emergency.

The present invention is not limited to the embodiments described above but includes various modifications. For example, the above-described embodiments are explained in detail for easy understanding of the description of the present invention, and does not necessarily include all the explained configurations. A part of the configuration in one embodiment can be replaced by a configuration in another embodiment, and the configuration in another embodiment can be added to the configuration in one embodiment. For a part of the configuration of each of the embodiments, another configuration can be added, deleted, or replaced. The above-described respective configurations, functions, processing units, processing means, or the like may be achieved by hardware, for example, a part of or all of which are designed with, for example, an integrated circuit. For example, the above-described respective configurations and functions may be achieved by software with which a processor interprets and executes programs achieving the respective functions. The program that achieves each function, tables, and information, such as files, can be placed in a memory, a storage unit, such as a hard disk and a Solid State Drive (SSD), or a storing medium, such as an IC card, an SD card, and a DVD.

REFERENCE SIGNS LIST

1 Portable transmission terminal
2 Manned vehicle mounted communication terminal
3 Unmanned vehicle mounted communication terminal
4 Relay base station
5 Control base station
10 Unmanned dump truck
20 Manned vehicle
30 Control center
31 Operation management system
32 Emergency deceleration/stop input device
100 Track
101 Transmission/reception antenna
102 Wireless device
103 Baseband device
104 Microcomputer device
105 Power supply device
106 Display device
107 Emergency deceleration/stop button
108 Controller
109 GPS receiver
110 GPS antenna
200 Loading site
300 Unloading site
500 Control communication
510 Road-to-road communication
520 Road-to-vehicle communication
530 Pedestrian-to-vehicle communication
540 Pedestrian-to-road communication
550 Vehicle-to-vehicle communication
600, 610, 700 Movable region
1000 Vehicle control system
1500 Control communication subframe
1510 Road-to-road communication subframe
1520 Road-to-vehicle communication subframe
1530 Pedestrian-to-vehicle communication subframe
1540 Pedestrian-to-road communication subframe
1550 Vehicle-to-vehicle communication subframe
1590 Reservation subframe
2000, 2100, 2200, 2300 Subframe allocation method

The invention claimed is:

1. A vehicle control system comprising:
an autonomous traveling vehicle configured to autonomously travel in a mine; and
a manned vehicle configured to be occupied and controlled by a driver or an occupant,
wherein the autonomous traveling vehicle and the manned vehicle each include an own position estimating device configured to obtain positional information of itself, and a vehicle mounted communication terminal configured to perform wireless communication,
wherein the vehicle control system is provided with a plurality of modulation schemes for wireless connection, and a plurality of wireless lines that wirelessly connect the vehicle mounted communication terminals,
wherein for each of the wireless lines, the vehicle mounted communication terminals are configured to be communicatively connected to each other via one wireless channel, the vehicle mounted communication terminals communicate with each other over the one wireless channel via one wireless frame constituted of a plurality of subframes by time division multiplexing scheme, and the plurality of subframes are configured to transmit same location information to each of the wireless lines, wherein the vehicle mounted communication terminal of the manned vehicle transmits manned vehicle location information as the positional information of the manned vehicle which is obtained by the own position estimating device of the manned vehicle, using a first modulation scheme obtained from a vehicle-to-vehicle distance or a propagation loss corresponding to a communication distance at a first location information granularity, the first modulation scheme being among the plurality of the modulation schemes, and wherein when the vehicle mounted communication terminal of the autonomous traveling vehicle determines that a distance from the manned vehicle is a first inter-vehicular distance threshold or less based on the manned vehicle location information transmitted by the first modulation scheme, the vehicle mounted communication terminal of the autonomous traveling vehicle instructs the vehicle mounted communication terminal of the manned vehicle to transmit the manned vehicle location information by a second modulation scheme different from the first modulation scheme, the second modulation scheme being among the plurality of the modulation schemes, at a second location information granularity smaller than the first location information granularity, and when the vehicle mounted communication terminal of the manned vehicle receives the instruction to transmit the manned vehicle location information using the second modulation scheme at the second location information granularity from the vehicle mounted communication terminal of the autonomous traveling vehicle, the manned vehicle transmits the manned vehicle location information using the second modulation scheme at the second location information granularity.

2. The vehicle control system according to claim 1,
wherein the vehicle mounted communication terminal of the manned vehicle is configured to generate an emergency deceleration/stop signal that instructs emergency deceleration or stop of the autonomous traveling vehicle and location information indicative of a current own location transmitted from a GPS receiver as transmission data, and wherein when the autonomous traveling vehicle receives the transmission data and when the distance from the manned vehicle determined according to at least one of a distance obtained based on current location information of the manned vehicle transmitted at the first location information granularity and a distance obtained based on the current location information of the manned vehicle transmitted at the second location information granularity is determined to be equal or less than a second inter-vehicular distance threshold shorter than the first inter-vehicular distance threshold or less, the autonomous traveling vehicle performs an operation to avoid a collision including deceleration or stop.

3. The vehicle control system according to claim 2,
wherein a communication that transmits the manned vehicle location information using the second modulation scheme at the second location information granularity is a vehicle-to-vehicle communication communicated between the autonomous traveling vehicle and the manned vehicle.

4. The vehicle control system according to claim 3,
wherein the autonomous traveling vehicles are a plurality of vehicles that are given respective individual priorities regarding the vehicle-to-vehicle communication, and wherein the vehicle-to-vehicle communication is assigned to the autonomous traveling vehicle having a value of the priority of a first value preferentially over the autonomous traveling vehicle having the value of the priority of a second value smaller than the first value.

5. The vehicle control system according to claim 4,
wherein the autonomous traveling vehicle determines whether the autonomous traveling vehicle travels on an ascending slope from a change in location information obtained by the own position estimating device or inclination information obtained from an inclination sensor included in a vehicle body, and when the autonomous traveling vehicle is determined to travel on the ascending slope, a priority higher than priorities of other autonomous traveling vehicles is given to the autonomous traveling vehicle.

6. The vehicle control system according to claim 4,
wherein when the autonomous traveling vehicle and the manned vehicle travel different courses with a difference in height and the manned vehicle is at a position higher than the autonomous traveling vehicle, a priority higher than priorities of other autonomous traveling vehicles is given to the autonomous traveling vehicle.

7. The vehicle control system according to claim 4,
wherein when the autonomous traveling vehicle is tracked by the manned vehicle, a priority higher than priorities of other autonomous traveling vehicles that are not tracked is given to the autonomous traveling vehicle.

8. The vehicle control system according to claim 4,
wherein the autonomous traveling vehicle further includes a pressure sensor to measure a load weight on a suspension cylinder that supports a wheel, and when a load having a predetermined weight or more is loaded, a priority higher than a priority when the load having the predetermined weight or more is not loaded is given.

9. The vehicle control system according to claim 1,
wherein a communication speed in the second modulation scheme is greater than a communication speed in the first modulation scheme.

* * * * *